United States Patent
Oya (10) Patent No.: US 10,882,406 B2
(45) Date of Patent: Jan. 5, 2021

(54) FUEL CELL SYSTEM

(71) Applicant: TOYOTA JIDOSHA KABUSHIKI KAISHA, Toyota (JP)

(72) Inventor: Ryosuke Oya, Miyoshi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 222 days.

(21) Appl. No.: 15/943,319

(22) Filed: Apr. 2, 2018

(65) Prior Publication Data
US 2018/0290559 A1 Oct. 11, 2018

(30) Foreign Application Priority Data

Apr. 7, 2017 (JP) ................... 2017-076975
Mar. 16, 2018 (JP) ................... 2018-049574

(51) Int. Cl.
| | | |
|---|---|---|
| H02J 1/00 | (2006.01) |
| B60L 1/00 | (2006.01) |
| B60L 11/18 | (2006.01) |
| B60L 58/40 | (2019.01) |
| H01M 8/04858 | (2016.01) |
| B60L 50/51 | (2019.01) |

(Continued)

(52) U.S. Cl.
CPC .......... *B60L 11/1887* (2013.01); *B60L 1/003* (2013.01); *B60L 50/51* (2019.02); *B60L 58/40* (2019.02); *H01M 8/0488* (2013.01); *H01M 8/04753* (2013.01); *H01M 8/04865* (2013.01); *H01M 8/04895* (2013.01); *H01M 16/006* (2013.01); *B60L 2210/14* (2013.01); *B60L 2210/40* (2013.01); *B60L 2240/547* (2013.01); *H01M 2220/20* (2013.01); *H01M 2250/20* (2013.01); *Y02B 90/12* (2013.01); *Y02T 10/7225* (2013.01)

(58) Field of Classification Search
CPC ....................................................... B60L 58/40
USPC .......................................................... 307/82
See application file for complete search history.

(56) References Cited

U.S. PATENT DOCUMENTS 8,673,514 B2 * 3/2014 Igarashi ............... B60L 1/003
                                                                429/432
2010/0291445 A1 11/2010 Igarashi
2015/0017485 A1 1/2015 Manabe et al.

FOREIGN PATENT DOCUMENTS

| JP | 2010-057284 A | 3/2010 |
| JP | 4561827 B2 | 10/2010 |
| JP | 5812523 B2 | 10/2015 |

(Continued)

*Primary Examiner* — Rexford N Barnie
*Assistant Examiner* — Dru Parries
(74) *Attorney, Agent, or Firm* — Finnegan, Henderson, Farabow, Garrett & Dunner, LLP (57) ABSTRACT

A control device is configured to control a first boost converter and a second boost converter. The control device is configured such that, when a prescribed state where an output of the second boost converter cannot be made at a ratio of an output voltage to an input voltage in the second boost converter to be equal to or more than a predetermined value is detected, the control device calculates a target output voltage of a fuel cell by using an voltage on an input side or an output side of the second boost converter measured by a measuring portion and a first value which is equal to or larger than a minimum boost ratio of the first boost converter, and controls the fuel cell so that an output voltage of the fuel cell is equal to or lower than the target output voltage.

2 Claims, 7 Drawing Sheets

(51) Int. Cl.
*H01M 8/04746* (2016.01)
*H01M 16/00* (2006.01)

(56) References Cited

FOREIGN PATENT DOCUMENTS

| | | |
|---|---|---|
| JP | 2016-010268 | 1/2016 |
| WO | WO2013/099009 | 7/2013 |

* cited by examiner

FUEL CELL SYSTEM

INCORPORATION BY REFERENCE

The disclosure of Japanese Patent Application No. 2018-049574 filed on Mar. 16, 2018 including the specification, drawings and abstract is incorporated herein by reference in its entirety.

BACKGROUND

1. Technical Field

The present disclosure relates to a fuel cell system configured such that respective boost converters are provided in a fuel cell and a secondary battery.

2. Description of Related Art

There is a related art about a fuel cell system including a fuel cell configured to generate electric power upon receipt of reactant gas, a secondary battery, and respective boost converters provided on respective output sides of the fuel cell and the secondary battery (e.g., see Japanese Patent Application Publication No. 2016-10268 (JP 2016-10268 A)).

SUMMARY

Figure 7:
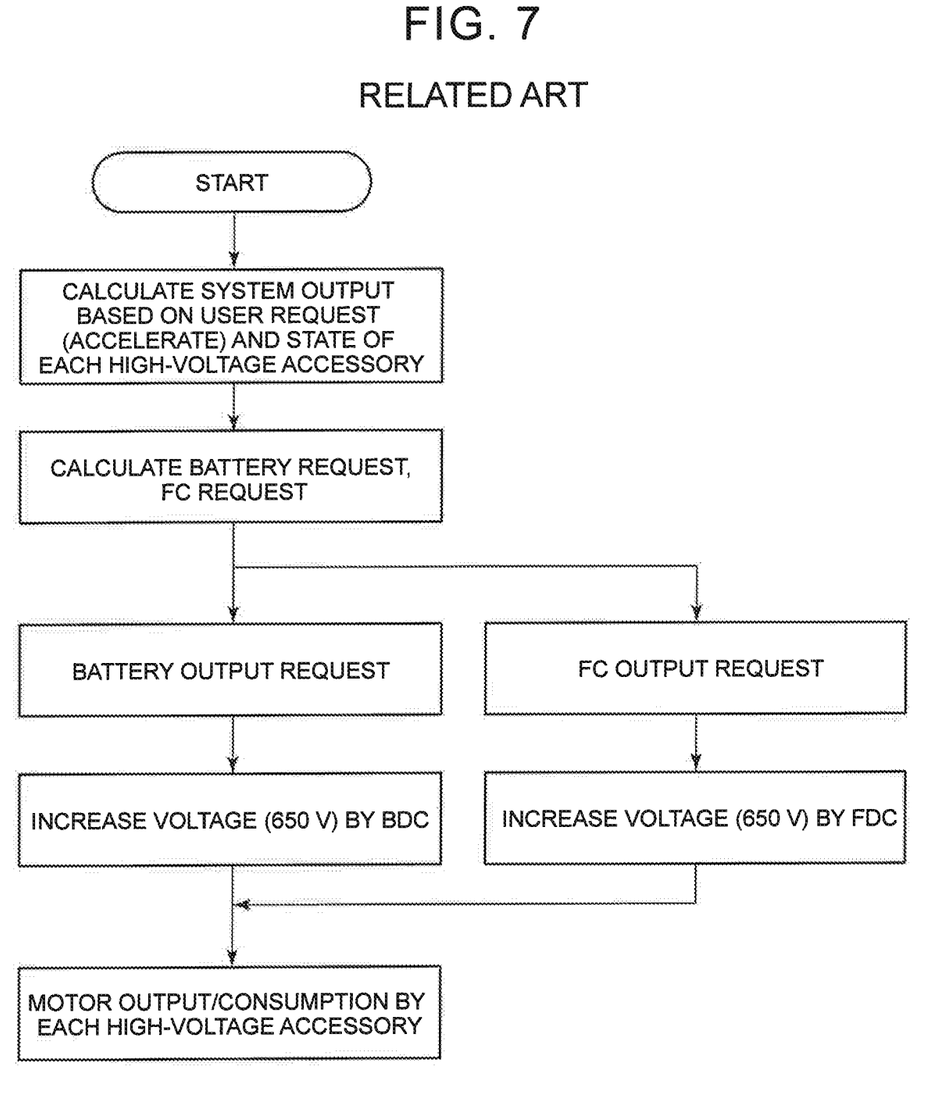
FIG. 7 is a flowchart to describe an example of a control by the control device in the normal state.

In this type of fuel cell system, in a case where the fuel cell system is provided in a vehicle, for example, as illustrated in a flowchart of FIG. 7, a system request output is calculated from an accelerator operation amount as a user request, a state of a high-voltage accessory such as an air compressor that supplies air to the fuel cell, and the like, and the system request output is distributed between a request output for the fuel cell and a request output for the secondary battery. Then, respective output voltages of the fuel cell and the secondary battery are increased to a predetermined voltage (e.g., 650 V) by a boost converter on a fuel cell side (hereinafter referred to as an FDC) and a boost converter on a secondary battery side (hereinafter referred to as a BDC), respectively, so as to correspond to respective request outputs thus distributed, and the request outputs are consumed for an output of a traction motor and an output for the high-voltage accessory.

In such a fuel cell system, when a failure occurs in a high-voltage circuit of the FDC and the BDC with respect to a drive motor and the high-voltage accessory, when an abnormal connection occurs in the high-voltage circuit, or when an abnormality occurs in characteristics of respective sensors for measuring an input voltage and an output voltage of the BDC, for example, such a control might be performed that a boost operation of a secondary battery output voltage by the BDC is limited so that the BDC enters a directly-connected state, in other words, a coupled state.

As such, in a case where a current can be applied to the BDC, but an output of the BDC cannot be made at a ratio between an input voltage and an output voltage to be a predetermined value or more, if an output voltage of the fuel cell is increased by the FDC to a voltage corresponding to the system request output, an over-voltage abnormality occurs on an input side or an output side of the BDC, which might cause such a state that the output voltage of the fuel cell cannot be increased by the FDC. When such a state occurs, an output of the fuel cell and charge and discharge of the secondary battery are mixed, so that an output current and an output voltage of the fuel cell become operating points obtainable in the course of events, which makes it difficult to perform an output control of the fuel cell.

The present disclosure provides a fuel cell system that can perform an output control of a fuel cell even in a case where a current is applicable to a boost converter on a secondary battery side, but an output of the boost converter cannot be made at a ratio between an input voltage and an output voltage to be equal to or more than a predetermined value.

An aspect of the disclosure is related to a fuel cell system including a fuel cell and a secondary battery as power sources to loads, a first boost converter configured to increase an output voltage of the fuel cell, a second boost converter configured to increase an output voltage of the secondary battery, a measuring portion configured to measure at least one of a voltage on an input side of the second boost converter and a voltage on an output side of the second boost converter, and a control device configured to control the first boost converter and the second boost converter. The control device includes a detection portion and a calculating portion. The detection portion is configured to detect a prescribed state where an output of the second boost converter is not made at a ratio of an output voltage of the second boost converter to an input voltage of the second boost converter to be equal to or more than a predetermined value. The calculating portion is configured to, when the prescribed state is detected, couple the input side of the second boost converter and the output side of the second boost converter and calculate a target output voltage of the fuel cell by using at least one of the voltage on the input side of the second boost converter and the voltage on the output side of the second boost converter measured by the measuring portion and a first value which is equal to or larger than a minimum boost ratio, the minimum boost ratio being a minimum ratio of an output voltage of the first boost converter to an input voltage of the first boost converter within a range where a boost operation of the first boost converter is guaranteed. An output side of the first boost converter and the output side of the second boost converter are electrically connected to each other. The control device is configured to control the fuel cell such that the output voltage of the fuel cell is equal to or lower than the target output voltage calculated by the calculating portion.

In the above aspect, the first value may be the minimum boost ratio.

In the above aspect, the control device may be configured to control the fuel cell when the prescribed state is detected such that the output voltage of the fuel cell is a constant value which is equal to or lower than the target output voltage.

In the above aspect, the control device may be configured to control electric power output from the fuel cell by adjusting a supply amount of oxidation gas to be supplied to the fuel cell.

According to the fuel cell system of the present disclosure, even in a case where an output of the second boost converter cannot be made at a ratio between the input voltage and the output voltage to be equal to or more than a predetermined value, an output control of cell can be performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
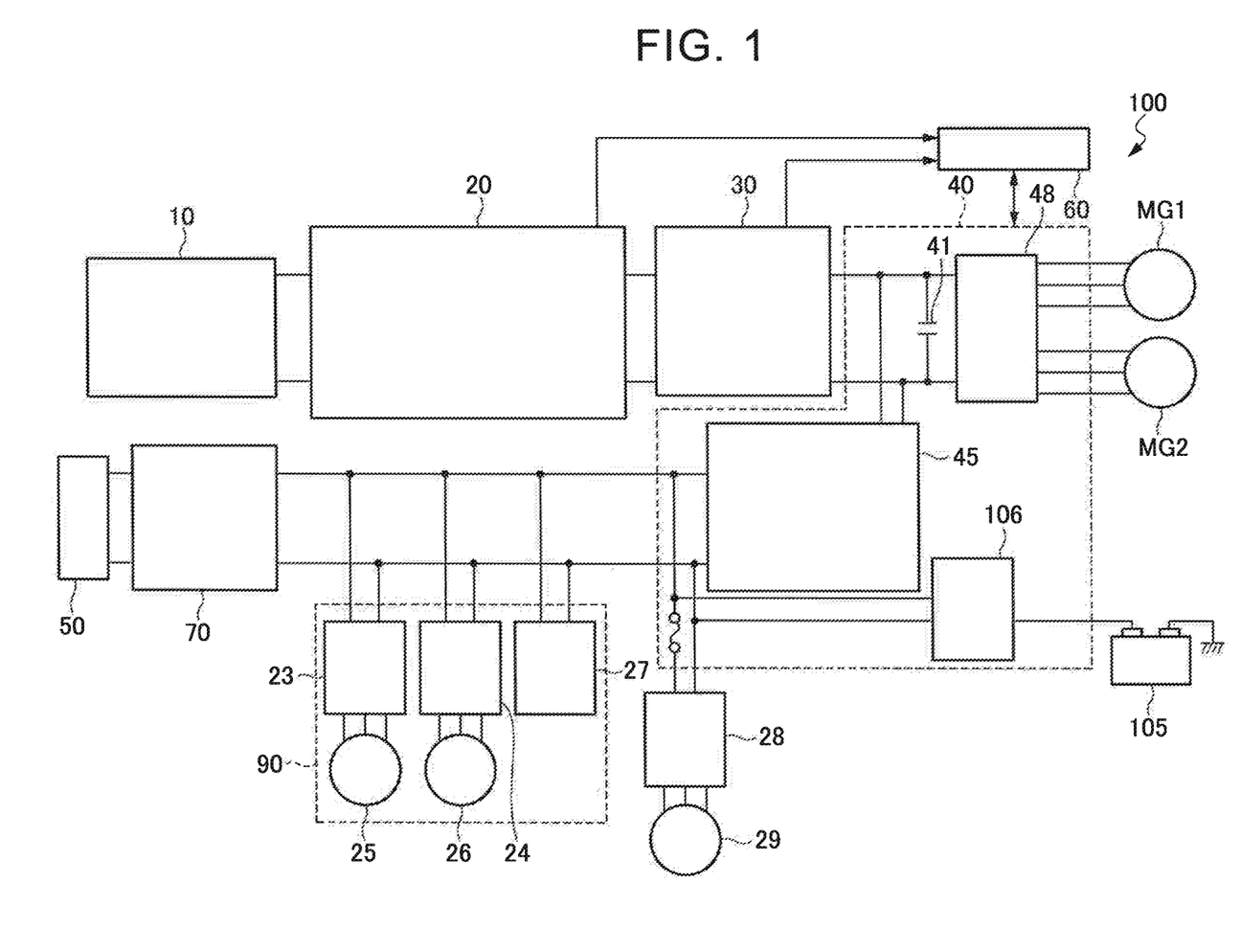
FIG. 1 is a system configuration diagram of a fuel cell system according to an embodiment of the present disclosure.

An embodiment of a fuel cell system according to the present disclosure will be described below with reference to the drawings. FIG. 1 is a schematic configuration diagram of a fuel cell system according to the embodiment of the present disclosure.

As illustrated in FIG. 1, a fuel cell system 100 includes a fuel cell 10, an FC boost converter (a first boost converter) 20, an FC relay circuit 30, a power control unit (PCU) 40, a secondary battery 50, a control device 60, a secondary-battery relay circuit 70, an auxiliary battery 105, an air compressor (load) MG1, and a traction motor (load) MG2.

The fuel cell 10 is a battery configured to generate electric power by reacting hydrogen with oxygen as reactant gases. A vehicle provided with the fuel cell system 100 includes a hydrogen tank (not shown) in which hydrogen (fuel gas) as the reactant gas is accumulated, and hydrogen is supplied from the hydrogen tank to the fuel cell 10. Atmospheric air is compressed by the air compressor MG1, and the air containing oxygen (oxidation gas) as the reactant gas is supplied from the air compressor MG1 to the fuel cell 10.

The FC boost converter 20 is a boost converter configured to increase a voltage output from the fuel cell 10 to a drive voltage of the air compressor MG1 and the traction motor MG2. The FC boost converter 20 is a converter that can control an output voltage of the fuel cell 10, in other words, an input voltage of the FC boost converter 20 to maintain it at a constant voltage.

The traction motor MG2 is a motor configured to drive tires of the vehicle provided with the fuel cell system 100 so that the vehicle runs. The traction motor MG2 is driven by electric power supplied from the fuel cell 10 or/and the secondary battery 50.

The FC relay circuit 30 is a circuit configured to switch electric connection and disconnection between the FC boost converter 20 and the PCU 40. The FC relay circuit 30 is placed between the FC boost converter 20 and the PCU 40.

The PCU 40 controls an amount of electric power to be transmitted to each part in the fuel cell system 100 based on a control signal transmitted from the control device 60. The PCU 40 includes a second capacitor 41, a secondary-battery boost converter (a second boost converter) 45, and an IPM (Intelligent Power Module) 48. The second capacitor 41 is a smooth power storage portion.

The secondary-battery boost converter 45 is a converter configured to increase a voltage output from the secondary battery 50 to the drive voltage of the air compressor MG1 and the traction motor MG2. The secondary-battery boost converter 45 is a boost converter to which a current is applicable by a conduction control in a prescribed failure mode.

For example, the failure mode corresponds to a state where a failure occurs in a high-voltage circuit of the FC boost converter 20 and the secondary-battery boost converter 45 with respect to the air compressor MG1 and the traction motor MG2, a state where an abnormal connection occurs in the high-voltage circuit, a state where art abnormality occurs in characteristics of respective sensors (not shown) for measuring an input voltage and an output voltage of the secondary-battery boost converter 45, and the like states. It can be said that the failure mode is a state where art output of the secondary-battery boost converter 45 cannot be made at a ratio of an output voltage to an input voltage thereof to be equal to or more than a predetermined value.

The IPM 48 is a power module connected to the air compressor MG1 and the traction motor MG2 that are electric loads.

The secondary battery 50 is a battery configured to temporarily store electric power obtained by generation of the fuel cell 10 and regenerative power of the traction motor MG2. The electric power stored in the secondary battery 50 is used as driving electric power for each constituent included in the fuel cell system 100. The secondary-battery relay circuit 70 is a relay circuit configured to switch electric connection and disconnection between the secondary battery 50 and the PCU 40.

An accessory consumable device 90 is a device that can use the electric power generated by the fuel cell 10, and includes accessory motors 25, 26, and accessory inverters 23, 24, and a heating water heater 27. The accessory motor 25 is a motor configured to drive a hydrogen pump for refluxing, to the fuel cell 10, hydrogen off-gas discharged from a hydrogen gas passage of the fuel cell 10. The accessory motor 26 is a motor configured to drive a cooling water pump for circulating a coolant used for adjusting a temperature of the fuel cell 10.

The accessory inverters 23, 24 convert a direct current into a three-phase alternating current, and supply it to the accessory motors 25, 26, respectively. Further, the fuel cell system 100 includes an accessory inverter 28 and an air conditioner 29 as accessories. Note that the "accessories" that consume electric power in the present embodiment are not limited to examples such as the accessory motors 25, 26, the accessory inverters 23, 24, the heating water heater 27, the accessory inverter 28, and the air conditioner 29, and include other devices that can consume electric power.

The auxiliary battery 105 is a battery for accessories, configured to temporarily store electric power supplied from the secondary battery 50, and is connected to a circuit of the secondary battery 50 via a DC/DC converter 106. The electric power stored in the auxiliary battery 105 is used to drive the accessories.

The control device 60 is a computer system configured to control operations of various devices of the fuel cell system 100. The control device 60 is a computer system to unify and control the fuel cell system 100, and includes, for example, a CPU, an RAM, an ROM, and the like. The control device 60 receives signals (e.g., a signal indicative of an accelerator operation amount, a signal indicative of a vehicle speed, a signal indicative of an output current or an output voltage of the fuel cell 10, and the like) supplied from various sensors, and calculates a requested electric power of a whole load including the air compressor MG1, the traction motor MG2, and the like.

In the fuel cell system 100 including the fuel cell 10, the secondary battery 50, the FC boost converter 20, and the secondary-battery boost converter 45 as described above, when the failure mode is detected, not only the output voltage of the secondary battery 50 but also the output voltage of the fuel cell 10 cannot be increased, which might make it difficult to control an output of the fuel cell 10.

In the fuel cell system 100 according to the present embodiment, the control device 60 has the following configuration, thereby making it possible to deal with such a failure mode.

Figure 2:
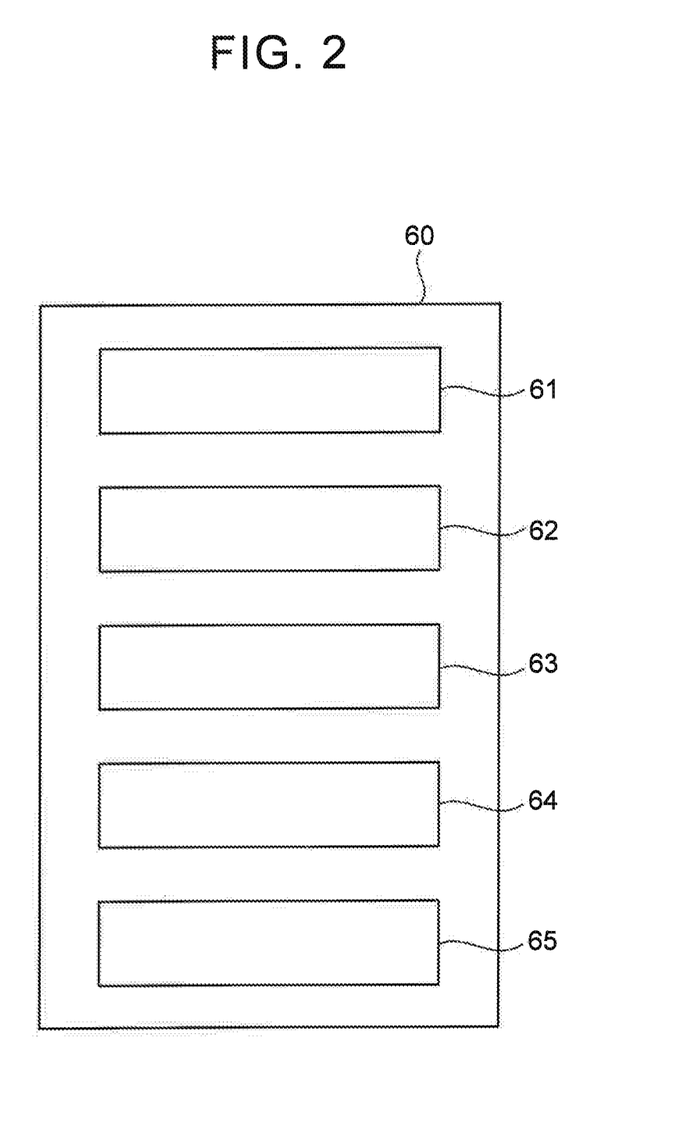
FIG. 2 is a block diagram to describe a configuration of a control device for the fuel cell system.

FIG. 2 is a block diagram to describe a configuration of the control device 60. As illustrated in FIG. 2, the control device 60 includes a secondary-battery abnormality detection portion (a detection portion) 61, a secondary-battery voltage measuring portion (a measuring portion) 62, a target voltage calculating portion (a calculating portion) 63, a boost converter controlling portion 64, and a fuel controlling portion 65. Note that the secondary-battery voltage measuring portion 62 may be provided outside the control device 60 if a voltage measured by the secondary-battery voltage measuring portion 62 is input into the control device 60.

Next, a control in the failure mode and in the normal state by the control device 60 of the fuel cell system 100 according to the present embodiment will be described. The following describes a control in the failure Mode and in the normal state with reference to a flowchart in FIG. 3 and system configuration diagrams in FIGS. 4 to 6.

Figure 3:
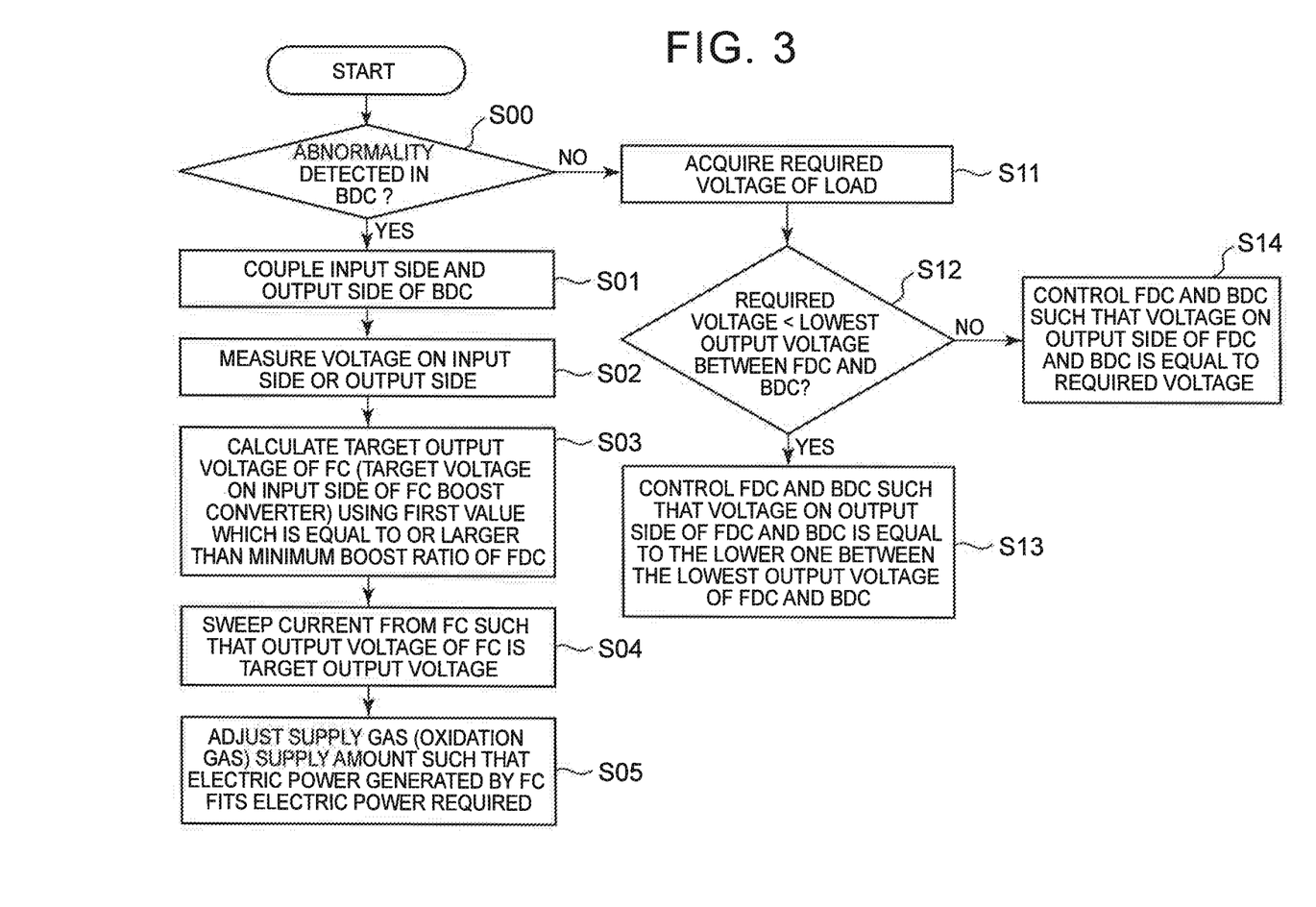
FIG. 3 is a flowchart to describe an example of a control by the control device.

FIG. 3 is a flowchart to describe an example of the control by the control device 60. The control device detects whether an abnormality is in the secondary-battery boost converter (BDC) 45 or not (step S00). For example, when any of the state where a failure occurs in the high-voltage circuit, the state where an abnormal connection occurs in the high-voltage circuit, and the state where an abnormality occurs in characteristics of respective sensors for measuring an input voltage and an output voltage of the secondary-battery boost converter 45 occurs, the secondary-battery abnormality detection portion 61 detects a state where an output of the secondary-battery boost converter 45 cannot be made at a ratio of the output voltage to the input voltage to be equal to or more than a predetermined value, that is, an abnormal output on a secondary-battery-50 side ("YES" in step S00).

At this time, the boost converter controlling portion 64 first controls the secondary-battery boost converter (BDC) 45 to a state where a current is applicable, but a voltage cannot be increased, that is, a state where an input side of the secondary-battery boost converter 45 and an output side of the secondary-battery boost converter 45 are coupled to each other (step S01). Hereby, a voltage state of the fuel cell system 100 is changed from a state illustrated in FIG. 4 to a state illustrated in FIG. 5.

Figure 4:
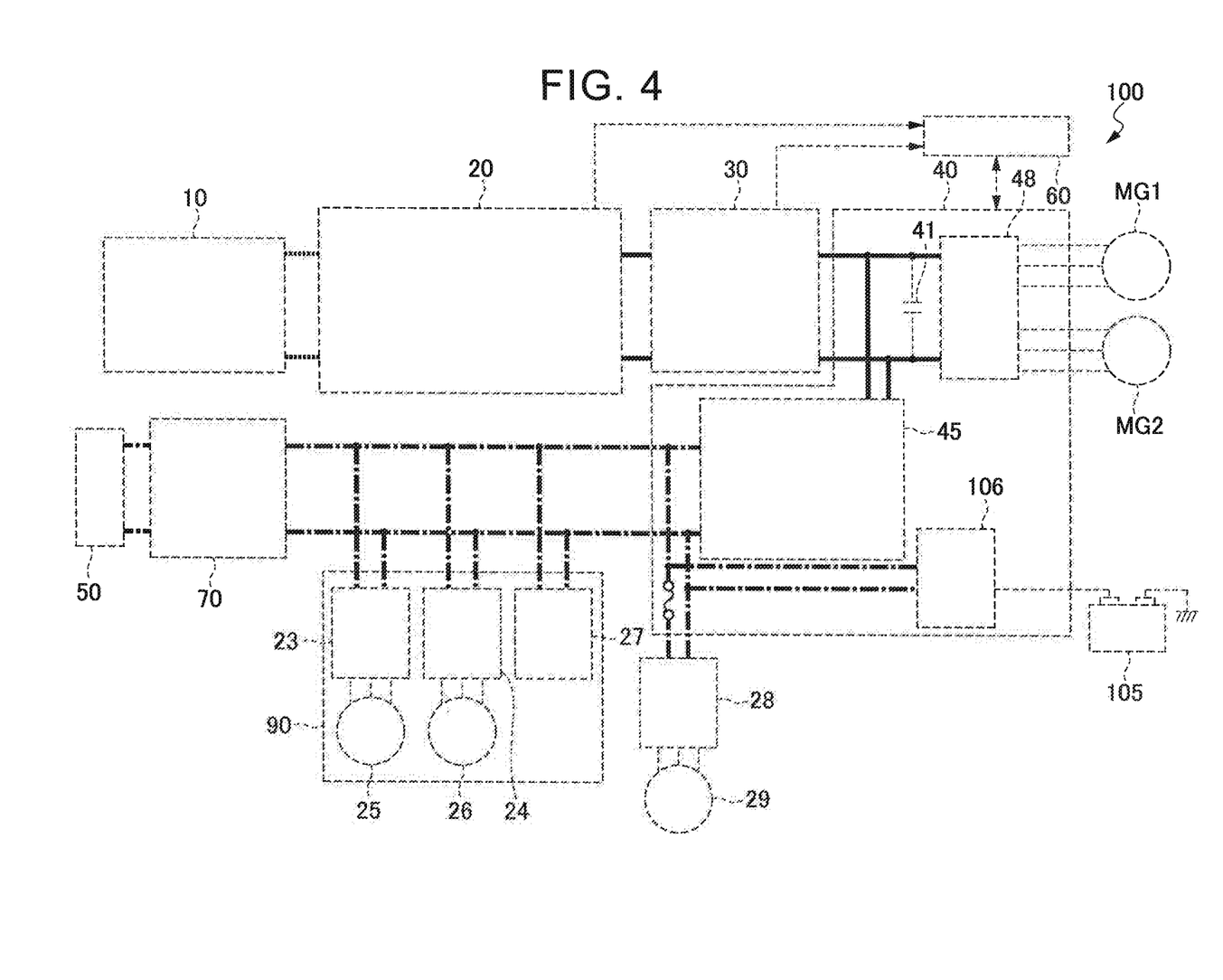
FIG. 4 is a system configuration diagram to describe a voltage state of the fuel cell system in a normal state.
Figure 5:
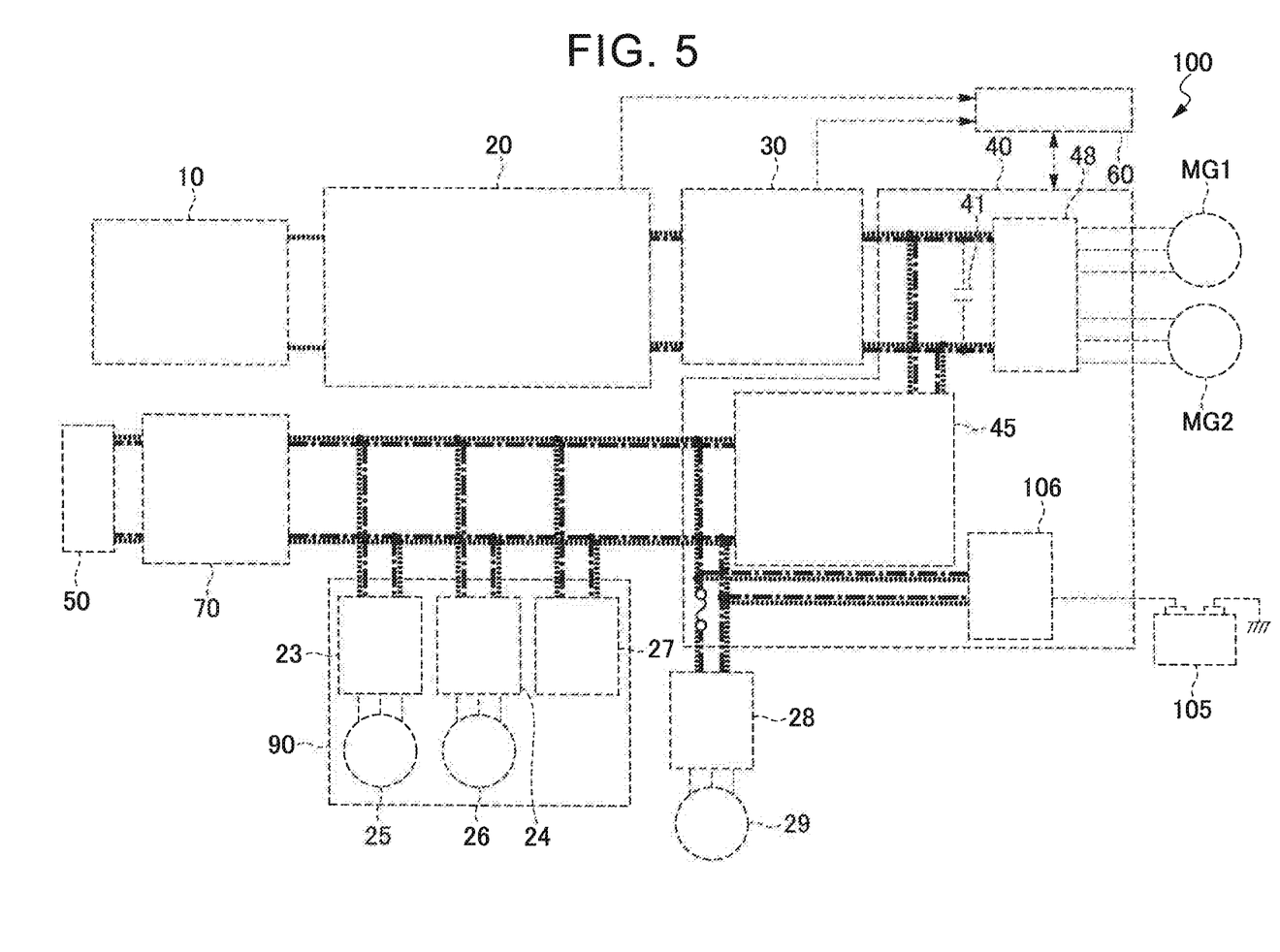
FIG. 5 is a system configuration diagram to describe a voltage state of a conventional fuel cell system in an abnormal state.

In FIG. 4 (in the normal state), for example, an input voltage (a voltage of a part indicated by an alternate long and short dash line) of the secondary-battery boost converter 45 is a predetermined voltage VL, an output voltage (a voltage of a part indicated by a continuous line) of the secondary-battery boost converter 45 is a predetermined boosted voltage VH, an output voltage (a voltage of a part indicated by a continuous line) of the FC boost converter 20 is the predetermined boosted voltage VH, and an input voltage (a voltage of a part indicated by a bold broken line) of the FC boost converter 20 is a predetermined common voltage VFC of the fuel cell 10. On the other hand, in FIG. 5, voltages of parts emphasized by an alternate long and short dash line and a broken line, that is, the input voltage of the secondary-battery boost converter 45, the output voltage of the secondary-battery boost converter 45, and the output voltage of the FC boost converter 20 are all an output voltage VB of the secondary battery 50, and the input voltage of the FC boost converter 20 is the predetermined common voltage VFC.

Referring back to FIG. 3, when an abnormal output on the secondary-battery-50 side is detected by the secondary-battery abnormality detection portion 61 ("YES" in step S00), and an input side of the secondary-battery boost converter 45 and an output side of the secondary-battery boost converter 45 are coupled to each other (step S01), an output voltage (a secondary battery voltage) of the secondary battery 50 is measured by the secondary-battery voltage measuring portion 62, that is, a voltage on the input side of the secondary-battery boost converter 45 or a voltage on the output side of the secondary-battery boost converter 45 is measured by the secondary-battery voltage measuring portion 62 (step S02).

The target voltage calculating portion 63 calculates a target voltage on an input side of the FC boost converter 20 that can be increased by the FC boost converter 20 relative to the voltage on the input side of the secondary-battery boost converter 45 or the voltage on the output side of the secondary-battery boost converter 45, that is, the target voltage calculating portion 63 calculates a target output voltage of the fuel cell (FC) 10. The target output voltage of the fuel cell 10 is calculated based on the voltage on the input side of the secondary-battery boost converter 45 or the voltage on the output side of the secondary-battery boost converter 45, which is measured by the secondary-battery voltage measuring portion 62, and a first value which is larger than a minimum boost ratio of the FC boost converter 20 (step S03). The first value is used as "a value which is equal to or larger than the minimum boost ratio of the FC boost converter 20" in the disclosure. The minimum boost ratio of the FC boost converter 20 is a minimum ratio of an output voltage to an input voltage in the FC boost converter (FDC) 20 within a range where a boost operation of the FC boost converter 20 is guaranteed.

More specifically, a product between the input voltage of the FC boost converter 20 and the first value is taken as the output voltage of the FC boost converter 20. Therefore, the target voltage on an input side of the FC boost converter 20, that is, the target output voltage of the fuel cell 10 is calculated such that the output voltage of the FC boost converter 20 is equal to the voltage on the input side of the secondary-battery boost converter 45 or the voltage on the output side of the secondary-battery boost converter 45.

The range where the boost operation of the PC boost converter 20 is guaranteed is a range where an operation is guaranteed so as to prevent such a situation that a control is not established due to an occurrence of output hunting (a phenomenon in which a duty cycle of the FC boost converter 20 is raised or lowered) of the PC boost converter 20, for example. The first value is, for example, set to be 1.5 in a case where the minimum boost ratio is 1.3, but the first value is not limited to this case.

When the target voltage on the input side of the FC boost converter 20, that is, the target output voltage of the fuel cell 10 is calculated by the target voltage calculating portion 63 (step S03), the boost converter controlling portion 64 controls the FC boost converter 20 so that the input voltage of the FC boost converter 20 becomes constant with respect to the target voltage on the input side of the FC boost converter 20 calculated by the target voltage calculating portion 63, and the boost converter controlling portion 64 applies load to the fuel cell 10 to sweep the current such that the output voltage of the fuel cell 10 is equal to or lower than the target output voltage (step S04).

Figure 6:
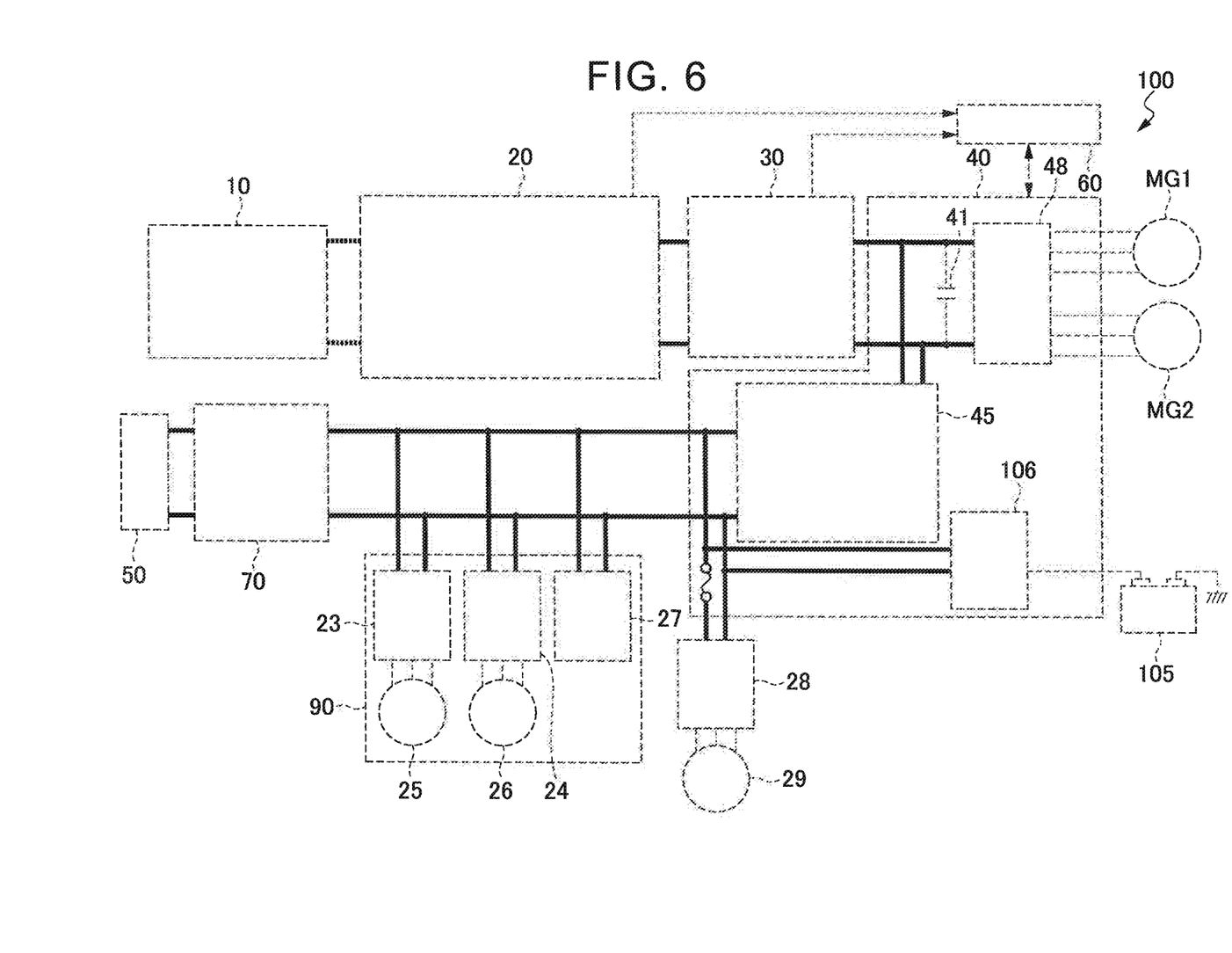
FIG. 6 is a system configuration diagram to describe a voltage state of fuel cell system of the embodiment of the present disclosure in an abnormal state.

At this time, a voltage state of the fuel cell system 100 becomes a state illustrated in FIG. 6. Voltages of parts emphasized by a bold continuous line, that is, the input voltage of the secondary-battery boost converter 45, the output voltage of the secondary-battery boost converter 45, and the output voltage of the FC boost converter 20 become the output voltage VB of the secondary battery 50, while the input voltage (a voltage of a part indicated by a bold broken line) of the FC boost converter 20 is fixed to the target voltage calculated by the target voltage calculating portion 63.

Referring back to FIG. 3, when the control of the FC boost converter 20 is performed by the boost converter controlling portion 64 (step S04), the fuel controlling portion 65 controls the air compressor MG1 and a valve placed in a passage for supplying an external air to the fuel cell 10 such that the electric power generated by the fuel cell 10 fits the electric power required in the fuel cell system, so as to adjust an oxygen supply amount to the fuel cell 10, thereby controlling electric power output from the fuel cell 10 to a load such as the traction motor MG2 and for charging the secondary bate 50 (step S05).

When an abnormal output on the secondary-battery-50 side is not detected ("NO" in step S00), that is, in the normal state, the control device 60 acquires a required voltage of the load such as the traction motor MG2 (step S11). This is because, for example, the required voltage of the traction motor MG2 increases when a rotational frequency or a required electric power for the traction motor MG2 is large.

It is determined that whether the required voltage of the load acquired in step S11 is lower than a lowest output voltage or not (step S12). In the disclosure, the "lowest output voltage" refers to voltage that is the lower one between the output voltage of the FC boost converter 20 and the output voltage of the secondary-battery boost converter 45. The lowest output voltage is calculated using the voltage of the fuel cell 10, the voltage of the secondary battery 50, the minimum boost ratio of the FC boost converter 20, and the minimum boost ratio of the secondary-battery boost converter 45. The minimum boost ratio of the secondary-battery boost converter 45 is a minimum ratio of an output voltage to an input voltage in the secondary-battery boost converter 45 within a range where a boost operation of the secondary-battery boost converter 45 is guaranteed.

When the required voltage of the load is lower than the lowest output voltage ("YES" in step S12), the control device 60 controls the FC boost converter 20 and the secondary-battery boost converter 45 such that the voltage on the output side of the FC boost converter 20 is equal to the lowest output voltage and the voltage on the output side of the secondary-battery boost converter 45 is equal to the lowest output voltage (step S13).

When the required voltage of the load is equal to or larger than the lowest output voltage ("NO" in step S12), the control device 60 controls the FC boost converter 20 and the secondary-battery boost converter 45 such that the voltage on the output side of the FC boost converter 20 is equal to the required voltage of the load and the voltage on the output side of the secondary-battery boost converter 45 is equal to the required voltage of the load.

As described above, according to the fuel cell system 100 of the present embodiment, even in a case where the failure mode occurs so that an output of the secondary-battery boost converter 45 cannot be made at a ratio between the input voltage and the output voltage to be equal to or more than a predetermined value, the target output voltage of the fuel cell 10 is calculated using the voltage on the input side of the secondary-battery boost converter 45 or the voltage on the output side of the secondary-battery boost converter 45 (that is, the output voltage of the secondary battery 50) and the first value which is equal to or larger than the minimum boost ratio of the FC boost converter 20. The minimum boost ratio of the FC boost converter 20 is the minimum ratio of the output voltage to the input voltage of the FC boost converter 20 within the range where the boost operation of the FC boost converter 20 is guaranteed.

Accordingly, even in a case where the failure mode occurs in the secondary-battery boost converter 45, it is able to restrain the output voltage of the FC boost converter 20, which is determined from the product between the input voltage of the FC boost converter 20 and the first value, from being larger than the voltage on the output side of the secondary-battery boost converter 45.

In the above embodiment, at the time of the control of the FC boost converter 20 by the boost converter controlling portion 64, the fuel controlling portion 65 of the control device 60 controls an air supply amount to the fuel cell 10, so as to control the electric power output from the fuel cell 10 to the load such as the traction motor MG2. Therefore, it is able to control the electric power output from the fuel cell 10 while restraining the deterioration of the fuel cell 10.

In another embodiment of the disclosure, the fuel controlling portion 65 may control the electric power output from the fuel cell 10 by adjusting a hydrogen supply amount to the fuel cell 10 by controlling a pressure regulating valve and an injector placed in a passage for supplying hydrogen to the fuel cell 10 from a hydrogen tank, a hydrogen pump placed in a passage for returning, to the fuel cell 10, hydrogen off-gas discharged from the fuel cell 10, and the like which are not shown in drawings.

In the foregoing embodiment, the first value which is larger than the minimum boost ratio is used as a value which is equal to or larger than the minimum boost ratio of the FC boost converter 20 for calculating the target output voltage of the fuel cell 10 (that is, the target voltage on the input side of the FC boost converter 20). However, the minimum boost ratio of the FC boost converter 20 is also able to be used as the first value. In this case, the target output voltage of the fuel cell 10 is calculated as a result of division of the voltage on the output side of the secondary-battery boost converter 45 by the minimum boost ratio of the FC boost converter 20. Therefore, it is able to set the target output voltage of the fuel cell 10 to be as large as possible, thus it is able to restrain heat emitted from the fuel cell 10.

In another embodiment of the disclosure, when the failure mode occurs in the secondary-battery boost converter 45, the control device 60 may control the fuel cell 10 such that the output voltage of the fuel cell 10 is set to be a constant value which is equal to or lower than the target output voltage of the fuel cell 10. Accordingly, in a case when the fuel cell 10 is controlled such that the output voltage of the fuel cell 10 is a constant value, the control may only control the value of a current swept from the fuel cell 10, thus the control of the electric power becomes easy.

What is claimed is:
1. A fuel cell system comprising:
 a fuel cell and a secondary battery as power sources to loads;
 a first boost converter configured to increase an output voltage of the fuel cell;

a second boost converter configured to increase an output voltage of the secondary battery;

a measuring portion configured to measure at least one of a voltage on an input side of the second boost converter and a voltage on an output side of the second boost converter; and a control device configured to control the fuel cell, the first boost converter and the second boost converter, the control device including a detection portion and a calculating portion, the detection portion being configured to detect a prescribed state where an output of the second boost converter is not made at a ratio of an output voltage of the second boost converter to an input voltage of the second boost converter to be equal to or more than a predetermined value, the calculating portion being configured to, when the prescribed state is detected, couple the input side of the second boost converter and the output side of the second boost converter and calculate a target output voltage of the fuel cell by using:

i) at least one of the voltage on the input side of the second boost converter and the voltage on the output side of the second boost converter measured by the measuring portion; and ii) a first value which is equal to or larger than a minimum boost ratio, the minimum boost ratio being a minimum ratio of an output voltage of the first boost converter to an input voltage of the first boost converter within a range where a boost operation of the first boost converter is guaranteed, wherein:

an output side of the first boost converter and the output side of the second boost converter are electrically connected to each other; and the control device is configured to:

control the fuel cell such that the output voltage of the fuel cell is equal to or lower than the target output voltage calculated by the calculating portion;

control the fuel cell when the prescribed state is detected to apply load to the fuel cell to sweep current of the fuel cell such that the output voltage of the fuel cell is a constant value which is equal to or lower than the target output voltage; and control electric power output from the fuel cell by adjusting a supply amount of oxidation gas to be supplied to the fuel cell.

2. The fuel cell system of claim 1, wherein the first value is the minimum boost ratio.

* * * * *